(12) United States Patent
Kikuchi

(10) Patent No.: US 6,698,292 B2
(45) Date of Patent: Mar. 2, 2004

(54) VIBRATORS AND VIBRATORY GYROSCOPES

(75) Inventor: Takayuki Kikuchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/384,958

(22) Filed: Mar. 10, 2003

(65) Prior Publication Data

US 2003/0177836 A1 Sep. 25, 2003

(30) Foreign Application Priority Data

Mar. 13, 2002 (JP) ..................... P2002-068862
Feb. 5, 2003 (JP) ..................... P2003-028600

(51) Int. Cl.[7] ............................................. G01N 29/00
(52) U.S. Cl. .................. 73/662; 73/504.12; 73/504.16
(58) Field of Search ...................... 73/662, 503.3, 73/504.12, 1.77, 504.11, 504.02, 504.04, 504.16; 310/311

(56) References Cited

U.S. PATENT DOCUMENTS

| | | | | |
|---|---|---|---|---|
| 6,013,971 A | * | 1/2000 | Fujimoto | 310/332 |
| 6,023,973 A | * | 2/2000 | Yabe et al. | 73/504.12 |
| 6,209,393 B1 | * | 4/2001 | Tomikawa et al. | 73/504.12 |
| 6,386,053 B1 | * | 5/2002 | Takeuchi et al. | 73/865 |
| 6,397,667 B1 | * | 6/2002 | Fujii et al. | 73/105 |
| 6,621,194 B1 | * | 9/2003 | Sugimoto et al. | 310/368 |

FOREIGN PATENT DOCUMENTS

JP 2001-012952 A 1/2001

OTHER PUBLICATIONS

U.S. 2003/0084723, Vibrator, vibratory gyroscope, and vibration adjusting method, Kikuchi et al.*

* cited by examiner

Primary Examiner—Hezron Williams
Assistant Examiner—Jacques Saint-Surin
(74) Attorney, Agent, or Firm—Burr & Brown (57) ABSTRACT

An object of the present invention is to reduce the zero point temperature drift of a vibrator and the deviation or change of the drift among vibrators actually fabricated. A vibrator has a driving vibration piece 2A, a detection vibration piece and a base portion connecting the driving and detection vibration pieces. The driving vibration piece 2A is composed of a bending vibration piece having a pair of surfaces 2c and 2d parallel with each other and a pair of side faces 2a and 2b. The driving vibration piece 2A has a ratio (WD/TD) of a width WD to a thickness TD of not smaller than 1.5 and not larger than 2.4.

26 Claims, 12 Drawing Sheets

VIBRATORS AND VIBRATORY GYROSCOPES

This application claims the benefits of Japanese Patent Applications P2003-28600 filed on Feb. 5, 2003, and P2002-68862 filed on Mar. 13, 2002, the entireties of which are incorporated by reference.

BACKGROUND OF THE INVENTION

1. Field of the Invention

The present invention relates to a vibrator and vibratory gyroscope.

2. Related Art Statement

It has been studied to use a vibratory gyroscope as a turning angular rate sensor employed in a vehicle control system of an automobile body based on a vehicle turning rate feedback system. Such a system detects the direction of a steering wheel itself by a turning angle of the steering wheel. Simultaneously, the turning rate of the car vehicle is detected by the vibratory gyroscope. The system finds a difference by comparing the direction of the steering wheel with the actual body turning velocity, and attains a stable vehicle control by correcting a wheel torque and a steering angle on the basis of this difference.

In a vehicle control system, a vibratory gyroscope and its vibrator is subjected to a wide temperature range including high and low temperatures, for example from minus 40° C. to plus 85° C. Even after the resonance frequency of a pair of bending vibration pieces is adjusted at a specific value, the resonance frequency may be substantially changed or deviated when the temperature is changed to a higher or lower temperature. As a result, so-called zero point temperature drift may be induced.

The assignee filed a Japanese patent publication 2001-12952A. In the publication, a tapered part is provided on the base part of each of the sides of a bending vibration piece for preventing the zero point temperature drift.

SUMMARY OF THE INVENTION

The inventors have studied such technique and found the following problems, depending on the material of the vibrator. That is, as described in Japanese patent publication 2001-12952A, tapered parts are provided in the bases of the side faces of a bending vibration piece so that the tapered parts have substantially the same planar shape. It is considered that the vibration mode of the bending vibration piece may be made more symmetrical to reduce the temperature drift. When the zero point temperature drift is measured for each of vibrators actually fabricated, however, the drift may be deviated among the vibrators. The deviation of zero point temperature drift may be increased so that the yield of off-specification products may be increased.

The reasons are as follows. Even when the zero point temperature drift of the vibrator cannot be made zero, it is possible to substantially cancel the drift by providing a correction circuit of the drift in a detection circuit of a vibratory gyroscope when the drift is made substantially constant. Even if the deviation of the drift of the vibrator actually fabricated is larger, the drift may be cancelled by means of the correction circuit in one vibrator. In this case, however, the drift in another vibrator may be considerably different from that in the one vibrator in which the drift is cancelled with the circuit. It is not possible to cancel the drift in another vibrator so that the performance of a vibratory gyroscope having this vibrator may be made out of a specification.

An object of the present invention is to reduce the zero point temperature drift of a vibrator and the deviation or change of the drift among vibrators fabricated.

A first invention provides a vibrator having a driving vibration piece, a detection vibration piece and a base portion connecting the driving and detection vibration pieces. The driving vibration piece is composed of a bending vibration piece having a pair of surfaces parallel with each other and a pair of side faces. The driving vibration piece has a ratio (WD/TD) of a width WD to a thickness TD of not smaller than 1.5 and not larger than 2.4.

A second invention provides a vibrator having a driving vibration piece, a detection vibration piece and a base portion connecting the driving and detection vibration pieces. The driving vibration piece is composed of a bending vibration piece having a pair of surfaces substantially parallel with each other and a pair of side faces. The driving vibration piece has a ratio (WD/TD) of a width WD to a thickness TD of not smaller than 0.3 and not larger than 0.8.

The invention further provides a vibratory gyroscope having any one of the vibrators.

The inventors have studied the cause of the deviation of the zero point temperature drift among vibrators and the increase of the drift. They finally found that it is possible to reduce the drift and the deviation or change of the drift among vibrators by adjusting a ratio (WD/TD) of a width WD to a thickness TD of a driving vibration piece at a value from 1.5 to 2.4. The invention is based on the discovery.

Although the reason is not clear, it may be considered as follows. That is, a wafer made of, for example, a piezoelectric single crystal, is etched for forming the outer shape of a vibrating piece. For example in the etching step, a photoresist is applied on both of upper and lower faces of the wafer. Photo masks are mounted on the photoresists, and the photo masks on the upper and lower faces are aligned with each other. The photoresist are exposed to light to harden it, and the photo masks are removed to complete the patterning of the photo resists. The wafer is then etched so that an outline corresponding with the pattern of the photoresist is formed on the wafer.

Figure 1:
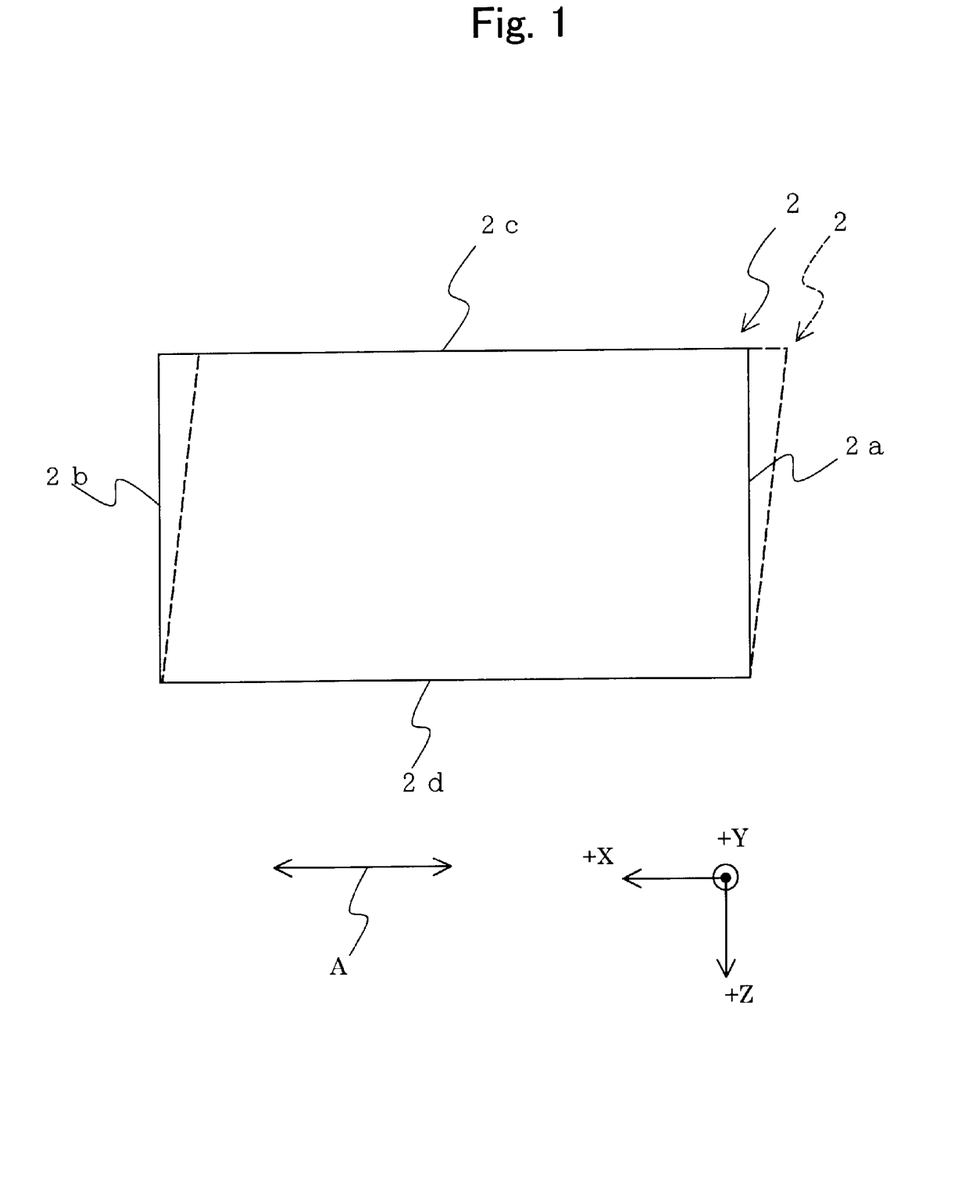
FIG. 1 is a diagram for explaining a mechanism of generation of unnecessary vibration component in a driving vibration piece.

When the photo masks are mounted on both of the upper and lower faces of the wafer and aligned with each other, alignment error may occur between the photo masks. In this case, as shown in FIG. 1, the cross sectional shape of the vibrating piece 2 is deformed to a shape of a parallelogram (see dotted lines). When the vibrating piece 2 is driven in a direction shown in an arrow A, unnecessary vibration component in the direction of z-axis is induced so that torsion vibration is induced in the detection vibration piece. Such noise component may be substantially changed depending on temperature to generate the zero point temperature drift. The deformation of the cross sectional shape of the vibration piece 2 is considered to be a cause of the drift.

Figure 2:
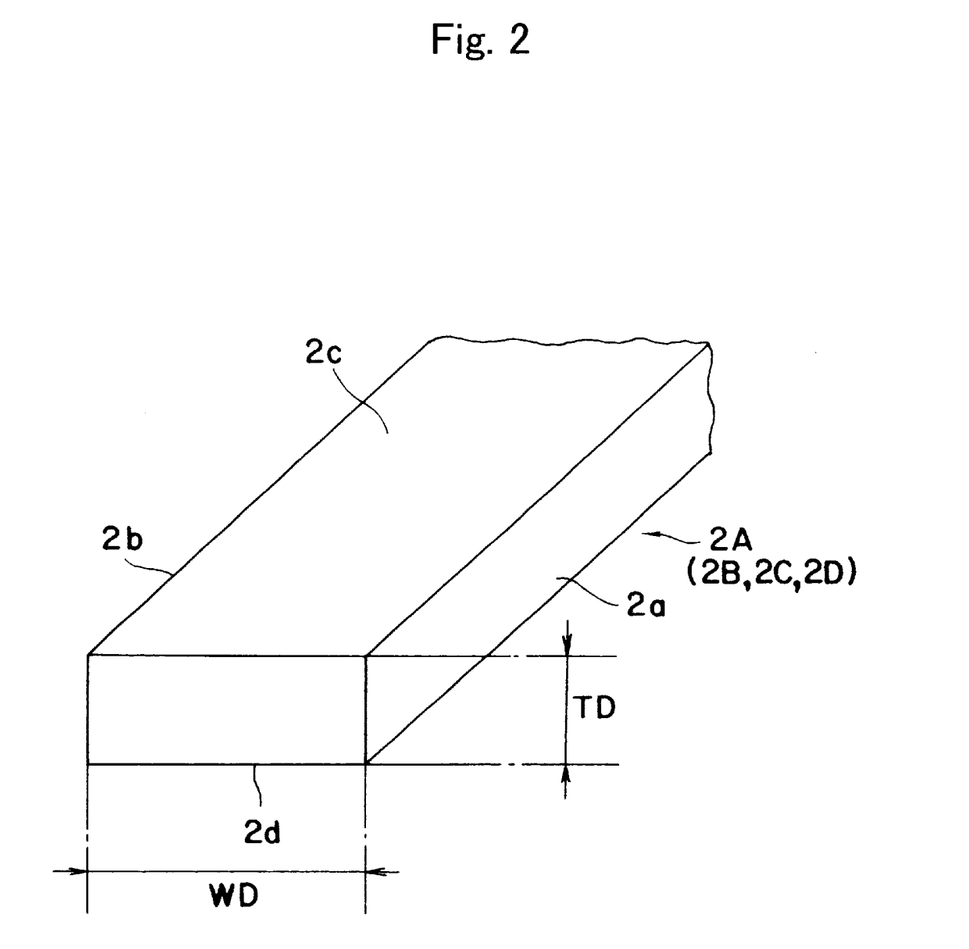
FIG. 2 is a diagram showing a shape of a driving vibration component according to a first invention.

According to the discovery, it is possible to reduce the drift and the deviation of the drift among vibrators by adjusting the ratio WD/TD of the width WD to the thickness TD of a driving vibration piece 2A at a value not smaller than 1.5, as shown in FIG. 2. Such effect may be due to the reduction of the unnecessary vibration component in the direction of z-axis by adjusting WD/TD at a value not smaller than 1.5, that is, by applying a wider cross sectional shape.

Further, when WD/TD exceeds 2.4, (when the width is too large in other words), torsion vibration component may be induced so that the unnecessary vibration component in Z-axis made considerable to increase the drift. It is thus necessary that WD/TD be not larger than 2.4.

Figure 4:
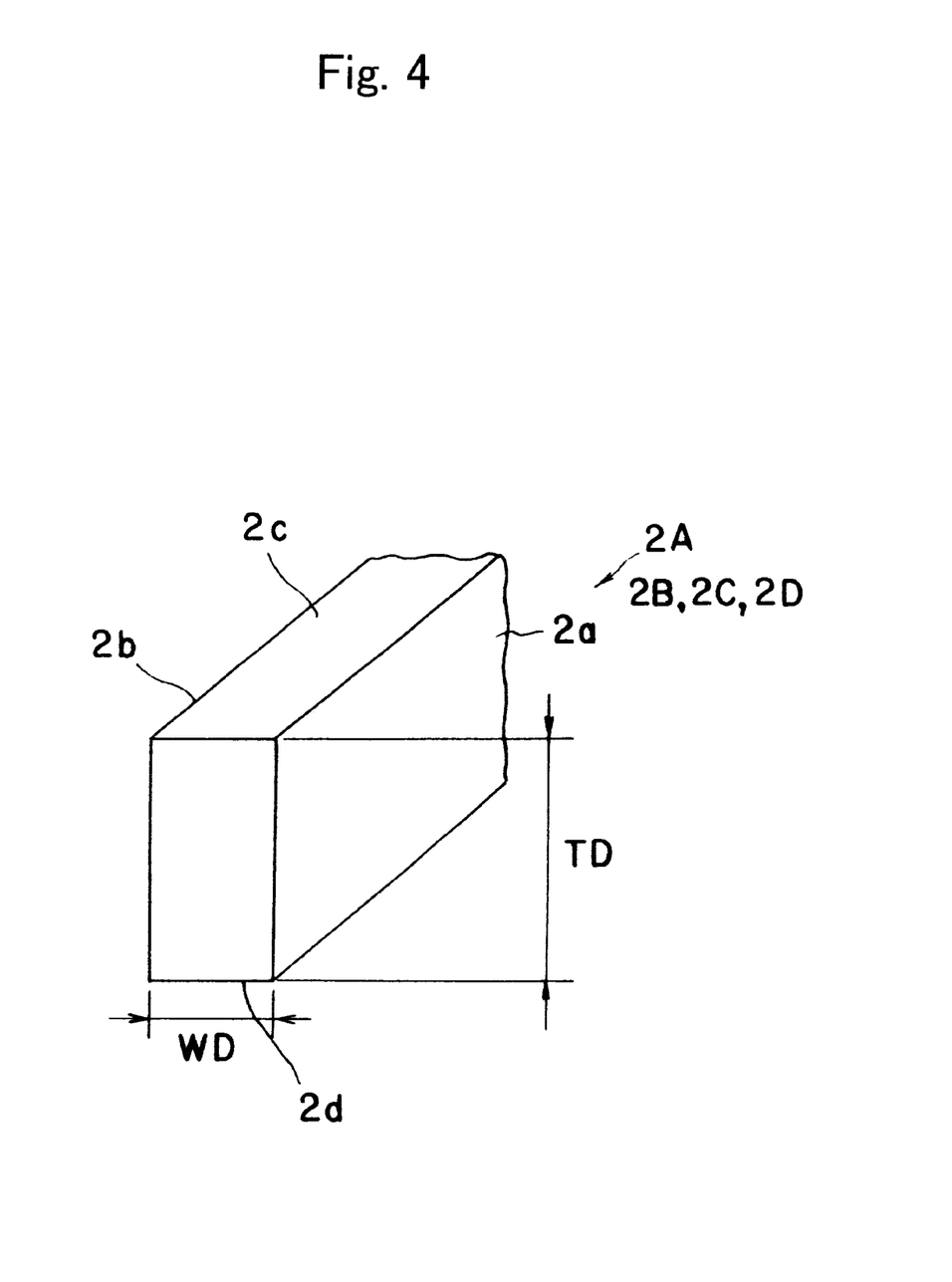
FIG. 4 is a diagram showing a shape of a driving vibration piece according to a second driving vibration piece.

Further, according to the discovery, it is possible to reduce the drift and the deviation of the drift among vibrators by adjusting the ratio WD/TD of the width WD to the thickness TD of a driving vibration piece 2A at a value not larger than 0.8, as shown in FIG. 4. Such effect may be due to the reduction of the unnecessary vibration component in the direction of z-axis by adjusting WD/TD at a value not larger than 0.8, that is, by applying a narrower cross sectional shape.

Further, when WD/TD is below 0.3 (when the width of the cross sectional shape is too narrow in other words), torsion vibration component may be induced so that the unnecessary vibration component in Z-azis made considerable to increase the drift. It is thus necessary that WD/TD be not smaller than 0.3.

It is considered that the effects of reducing zero-point temperature drift is considerable as the difference of the thickness and width of the vibration piece is smaller. When the thickness and width of the vibrating piece is substantially identical, the vibration component in the direction of width and that in the direction of thickness have the substantially same characteristic resonance frequency with each other. Mode coupling may be thus easily induced. When the vibrating piece is driven along a specified plane, the mode coupling may generate a large vibration component in the direction of z-axis.

These and other objects, features and advantages of the invention will be appreciated upon reading the following description of the invention when taken in conjunction with the attached drawings, with the understanding that some modifications, variations and changes of the same could be made by the skilled person in the art.

BRIEF DESCRIPTION OF THE DRAWINGS

FIG. 11($a$) is a front view showing a vibrator and a substrate mounting the chip 23.

FIG. 11($b$) is a plan view showing the vibrator and the substrate.

PREFERRED EMBODIMENTS OF THE INVENTION

In the first invention, WD/TD may preferably be not smaller than 1.7 and more preferably be not smaller than 2.0 for further reducing the deviation of zero point temperature drift.

In the first invention, the width WD of the driving vibration piece may preferably be not larger than 300 $\mu$m for improving the sensitivity. This width WD may preferably be not smaller than 200 $\mu$m for reducing the unnecessary vibration component. The thickness TD of the driving vibration piece may preferably be not larger than 150 $\mu$m for improving the sensitivity. This thickness TD may preferably be not smaller than 50 $\mu$m for reducing the unnecessary vibration component.

In the second invention, WD/TD may preferably be not larger than 0.7 and more preferably be not larger than 0.6 for further reducing the deviation of zero point temperature drift.

In the second invention, the width WD of the driving vibration piece may preferably be not smaller than 40 $\mu$m for improving the sensitivity. The width WD may preferably be not larger than 150 $\mu$m for reducing the unnecessary vibration component. The thickness TD of the driving vibration piece may preferably be not larger than 300 $\mu$m for improving the sensitivity. This thickness TD may preferably be not smaller than 100 $\mu$m for reducing the unnecessary vibration component.

In a preferred embodiment, the driving and detection vibration pieces are plate-shaped. The operational mode of the vibration pieces is not limited and may preferably be bending vibration mode. Further, the vibration pieces may preferably be formed along a specified plane. In this case, it is not required that the vibration piece is formed along a specified plane in a geometrically strict meaning and production error is allowed. In this case, a vibrator may have the vibration pieces and the other parts which is not plate-shaped. In a preferred embodiment, the whole of the vibrator is plate shaped.

In a preferred embodiment, for example as shown in FIG. 2, the vibrator has surfaces 2$c$ and 2$d$ both substantially parallel with the specified plane (X-Y plane).

Figure 3:
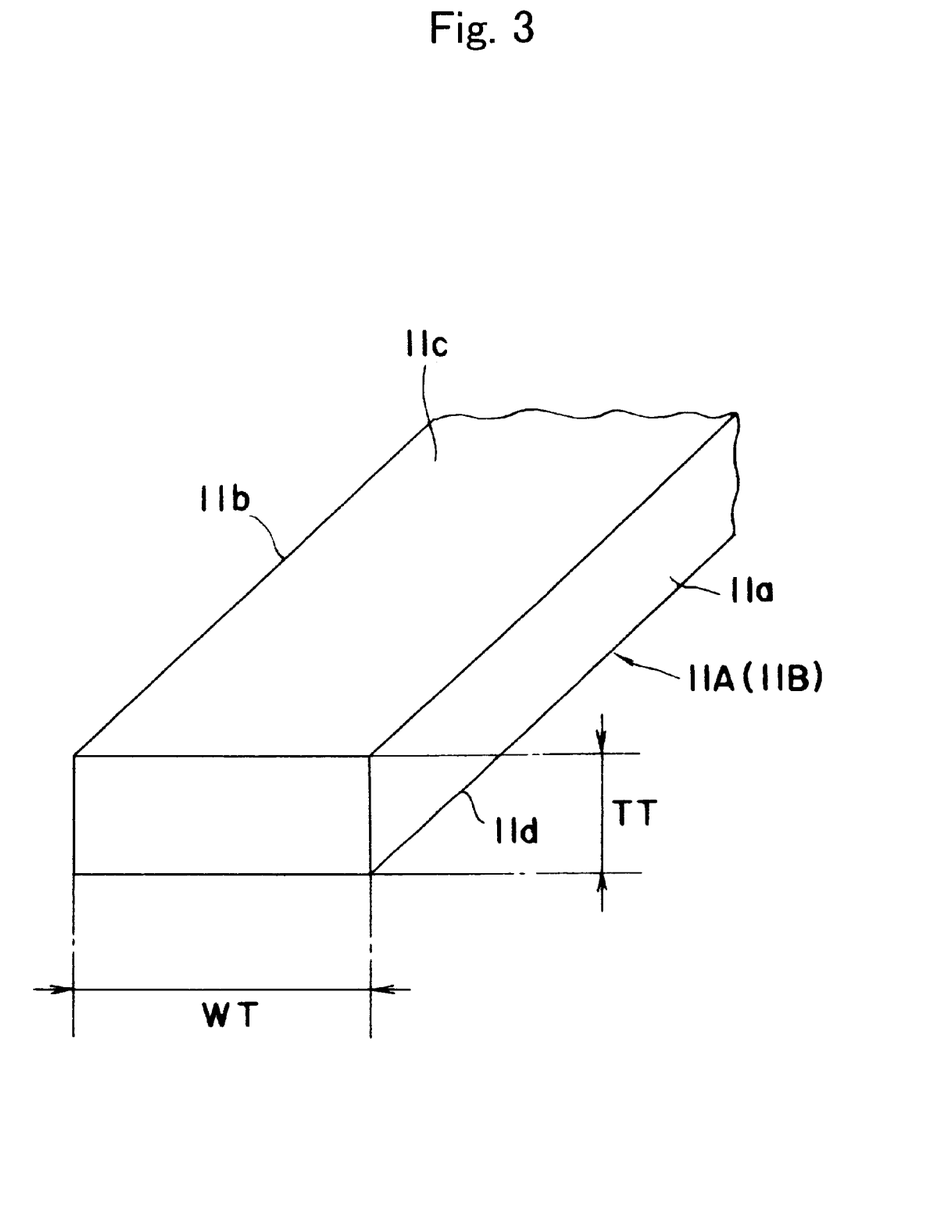
FIG. 3 is a diagram showing a shape of a detection vibration piece.

In a preferred embodiment, as shown in FIG. 3, detection vibration pieces 11A (11B) are bending vibration pieces each having a pair of surfaces 11$c$ and 11$d$ substantially parallel with each other and a pair of side faces 11$a$ and 11$b$. A ratio (WT/TT) of the thickness WT to the thickness TT of the detection vibration piece is not smaller than 1.5 and not larger than 3.0. That is, also in the detection vibration piece, zero point temperature drift may be generated due to the torsion vibration component. It is found that such unnecessary vibration component may also be reduced by the present invention. On this point of view, it is possible to reduce the unnecessary vibration component in the direction of Z-axis by adjusting WT/TT at a value not smaller than 1.5, that is by applying a wider cross sectional shape.

When WT/TT exceeds 3.0 (the width becomes too large), the torsion vibration component become large so that zero point temperature drift may be increased. Thus, WT/TT may preferably be not larger than 3.0.

WT/TT may preferably be not smaller than 1.7 and may more preferably be smaller than 2.0 for further reducing the change of zero point temperature drift. WT/TT may preferably be not larger than 2.5.

The width WT of the detection vibration piece may preferably be not larger than 300 $\mu$m. WT may preferably be not smaller than 150 $\mu$m for reducing the unnecessary vibration component. The thickness TT of the detection vibration piece may preferably be not larger than 150 $\mu$m for improving the sensitivity. TT may preferably be not smaller than 50 $\mu$m for reducing the unnecessary vibration component.

Figure 5:
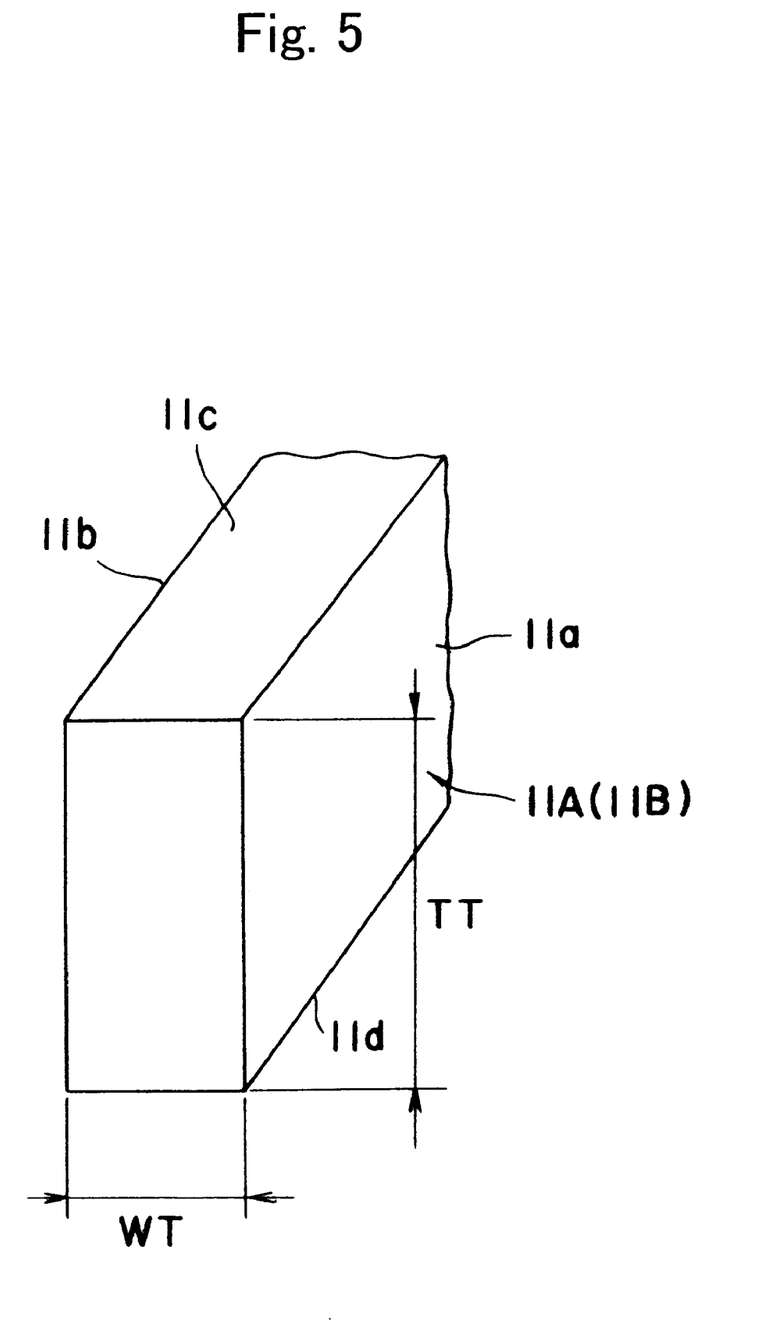
FIG. 5 is a diagram showing a shape of a detection vibration piece.

Further, the inventors have successfully reduced the unnecessary vibration component in the direction of z-axis by adjusting WT/TT at a value not larger than 0.8 as shown in FIG. 5.

When WT/TT is below 0.3 (the width becomes too small), the torsion vibration component become large so that zero point temperature drift may be increased. Thus, WT/TT may preferably be not smaller than 0.3. WT/TT may preferably be not larger than 0.7 and more preferably be not larger than 0.6 for reducing the deviation of zero point temperature drift.

The width WT of the detection vibration piece may preferably be not smaller than 40 μm. WT may preferably be not larger than 150 μm for reducing the unnecessary vibration component. The thickness TT of the detection vibration piece may preferably be not larger than 300 μm for improving the sensitivity. TT may preferably be not smaller than 100 μm for reducing the unnecessary vibration component.

The material of the vibrator is not particularly limited, and may preferably be a piezoelectric single crystal. The material may more preferably be a piezoelectric single crystal selected from the group consisting of quartz, lithium niobate, lithium tantalite, lithium niobate-lithium tantalite solid solution, lithium borate and langasite.

In a particularly preferred embodiment, the vibrator is made of a piezoelectric single crystal having three a-axes of tri-centrosymmetrical system in a specified plane and a c-axis in a direction perpendicular to the specified plane. The single crystal is preferably quartz.

In a preferred embodiment, one side face is [$2\overline{1}\overline{1}0$] face and the other side face is [$\overline{2}110$] face. In this case, the shape of a protrusion formed on the other side face 2b may be considerably changed so that zero point temperature drift may be increased.

The zero point temperature drift due to the deviation of output from the inventive vibrator may be affected by the cross sectional shape of the vibrator, irrelevant of a process for forming the vibrator. The process for forming the vibration pieces and vibrator according to the present invention is thus not particularly limited and may be wet etching, dry etching as well as laser beam processing.

On the viewpoint of actual production, wet etching method is most preferred. In this case, an etchant is not limited and may be as follows. The etchant may contain fluoric acid and may preferably be aqueous solution of fluoric acid or fluoric acid and ammonium fluoride mixed at an arbitrary ratio. The content of the etchant may preferably be not higher than 40 weight percent and the temperature of the etchant may preferably be 40 to 80° C.

The vibratory gyroscope according to the present invention has the vibrator as described above. The gyroscope further has a driving means and detecting means. The driving and detecting means are generally composed of electrodes formed on the vibrator, respectively.

In a preferred embodiment, the vibratory gyroscope of the present invention measures a turning angular rate around a turning axis Z substantially perpendicular to the specified plane X-Y. Preferably, each vibration piece is bent in bending vibration mode along the specified plane X-Y. In a preferred embodiment, the vibrator has a supporting part protruding from a base portion and the supporting part supports the driving vibration piece.

Figure 6:
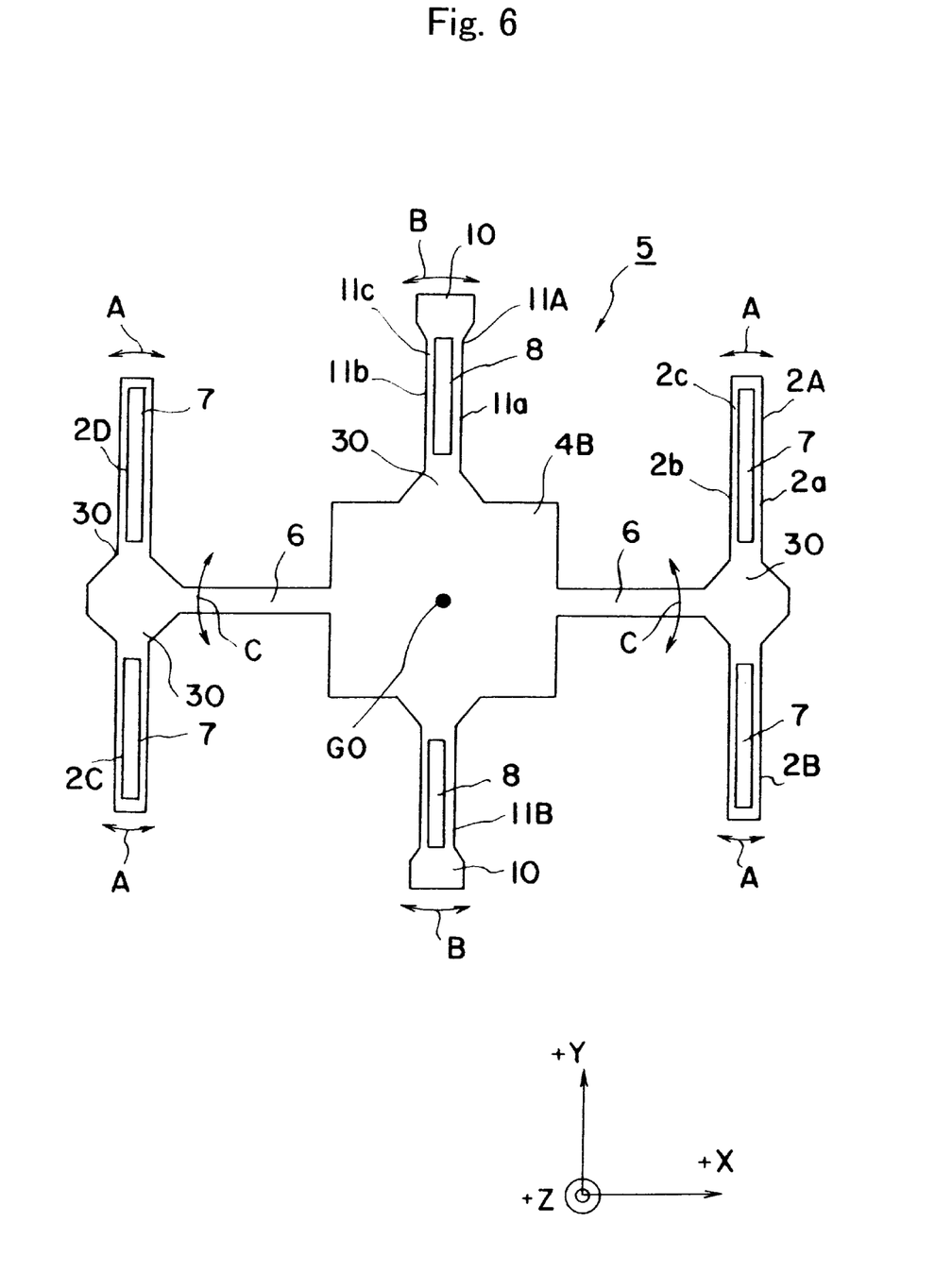
FIG. 6 is a plan view of a vibrator 5 according to one embodiment of the present invention.
Figure 7:
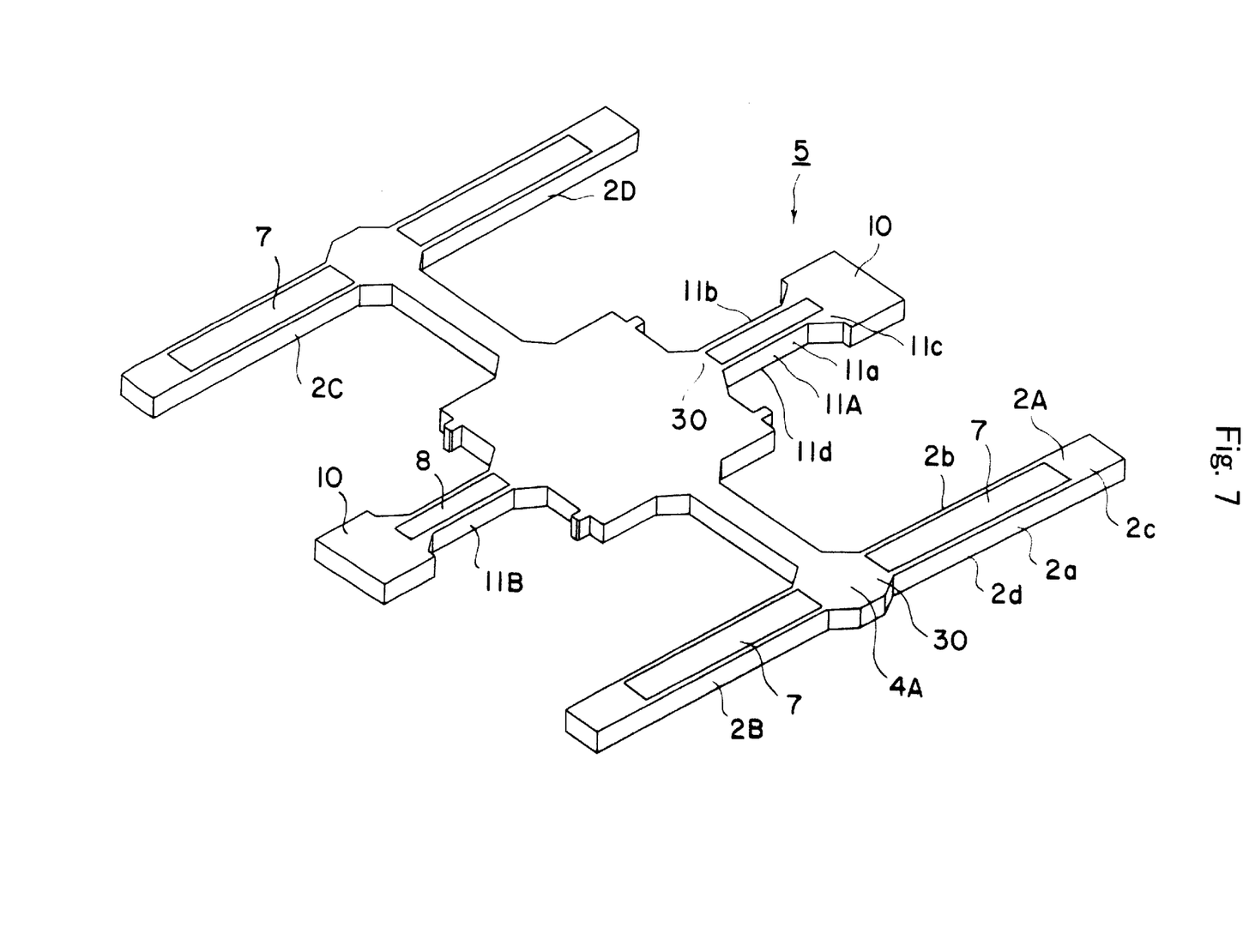
FIG. 7 is a perspective view of a vibrator 5 of FIG. 6.

FIG. 6 is a plan view showing a vibrator according to this embodiment of the present invention, and FIG. 7 is a perspective view showing the vibrator.

The vibrator 5 measures a turning angular rate around Z-axis substantially perpendicular to the specified plane (X-Y plane). The vibrator 5 has a fixing part 4B having a square shape of quad-symmetrical with respect to the center of gravity GO of the vibrator. Elongate supporting parts 6 are protruded from the edge of the fixing part 4B. A pair of driving vibration pieces 2A and 2B on z-axis are protruded from the tip part of each supporting part 6 in the direction perpendicular to the supporting part 6. The base part 30 of each driving vibration piece is protruded from the tip part of each supporting part so that the base part 30 may function as a fixing part for each driving vibration piece. Driving electrodes 7 are provided on each driving vibration piece.

Elongate detection vibration piece 11A or 11B is protruded from the outer edge of the fixing part 4B. Detection vibration pieces 8 are provided on each of the detection vibration pieces. An weight portion 10 is provided on each of the detection vibration pieces 11A or 11B for detection.

In driving vibration mode, each of the driving vibration pieces 2A, 2B, 2C and 2D is vibrated in bending vibration mode as an arrow A around the base part 30. In detection vibration mode, each supporting part 6 is vibrated in bending vibration mode circumferentially as an arrow C around the base part to the fixing part 4B. Responsive to this, each of the detection vibration pieces 11A and 11B is vibrated as an arrow B. Detection vibration induced in each of the detection vibration pieces 11A and 11B is measured to calculate a turning angular rate around Z-axis.

Figure 8:
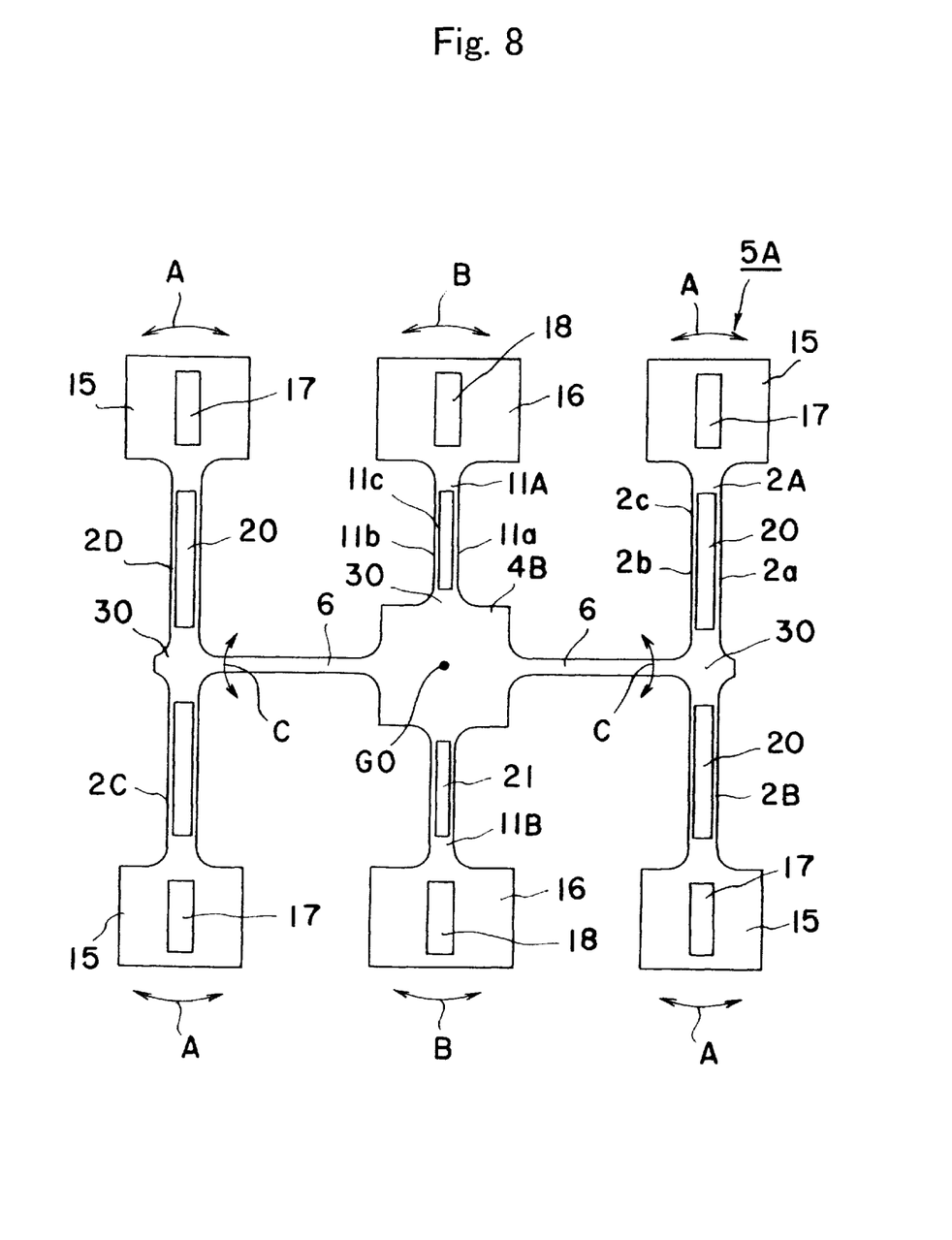
FIG. 8 is a plan view showing a vibrator 5A according to an embodiment of the present invention.
Figure 9:
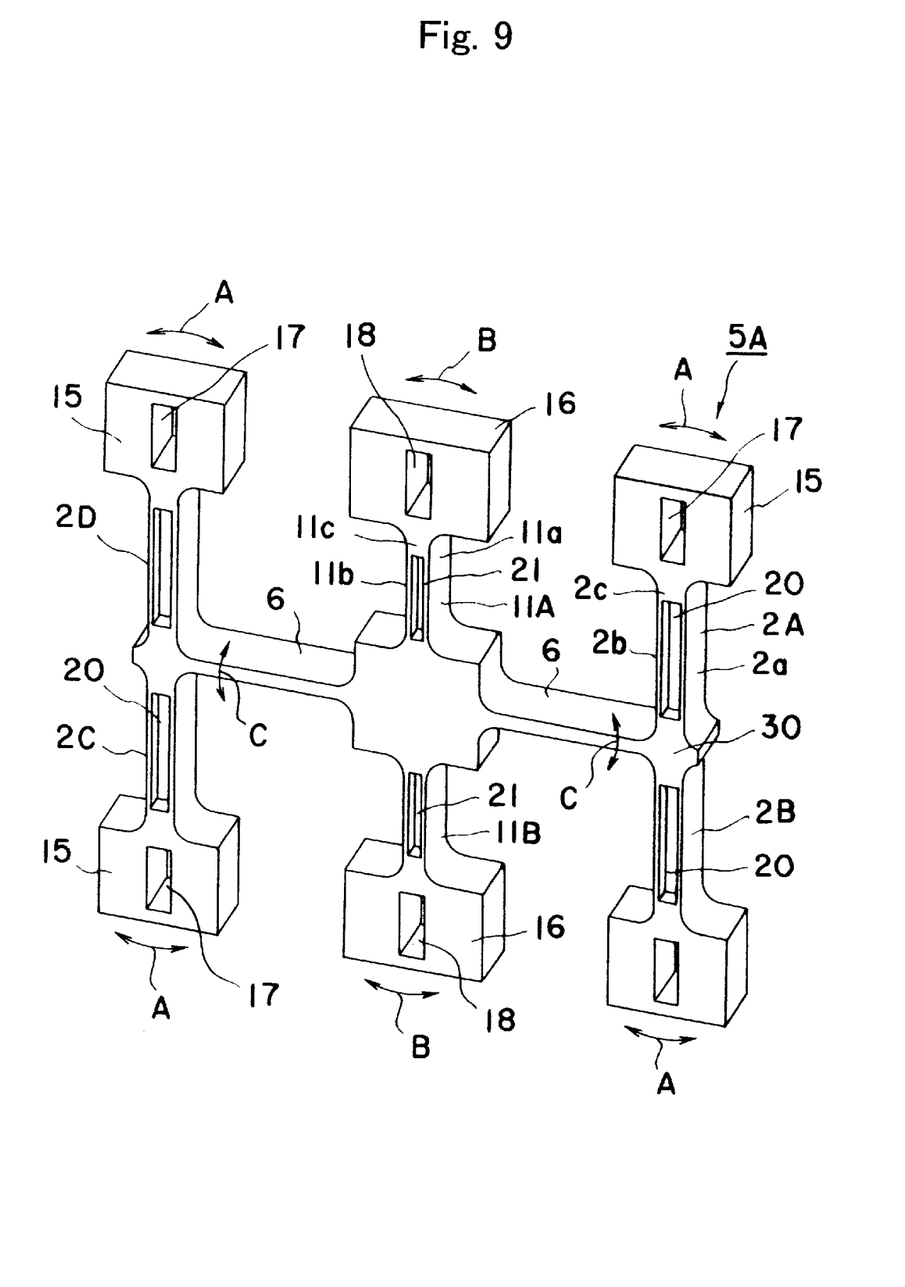
FIG. 9 is a perspective view showing the vibrator 5A of FIG. 8.

Further, in a preferred embodiment, each vibration piece has a weight or enlarged portion in the tip part, or, a groove or through hole therein. FIG. 8 shows a vibrator 5A according to this embodiment, and FIG. 9 is a perspective view showing the vibrator 5A of FIG. 8.

The shape and mechanism of the vibrator 5A is substantially same as those shown in FIGS. 6 and 7. In the vibrator 5A, elongate grooves 20 are formed in the surfaces 2c and 2d of each of the driving vibration pieces 2A, 2B, 2C and 2D. A driving electrode is formed in each groove 20. A weight part or enlarged part 15 is provided in the tip part of each of the detection vibration pieces 2A, 2B, 2C and 2D. A through hole 17 is formed in the weight or enlarged part 15. Further, elongate grooves 21 are formed in the surfaces 11c and 11d of each of the detection vibration pieces 11A and 11B. A detection electrode is provided in the groove 21. Further, an enlarged or weight part 16 is provided in the tip part of each of the detection vibration pieces 11A and 11B. A through hole 18 is formed in the weight part 16.

EXAMPLES (Experiment 1)

The vibrator and vibratory gyroscope shown in FIGS. 6 and 7 were produced. Specifically, chromium films of 200 angstroms in thickness and gold films of 1000 angstroms in thickness were formed in turns on a wafer made of a Z-plate of quartz with a predetermined thickness. Both main faces of the wafer were coated with resist films, respectively, and photo masks were mounted for exposing light.

The wafer was then immersed in aqueous solution of iodine and potassium iodide to remove excessive gold in the gold film by etching, and was further immersed in aqueous solution of cerium-ammonium nitrate and perchloric acid to remove excessive chromium in the chromium film by etching.

The wafer was etched by immersing the wafer in ammonium bifluoride at a temperature of 80° C. for 20 hours to form the external shape of the vibrator 5. Aluminum films each having a thickness of 2000 angstrom was formed as electrode films 7 and 8 using a metal mask.

The thus obtained vibrator 5 had a fixing part 4B with a length of 6.0 mm and a width of 6.0 mm. Each of the driving vibration pieces 2A, 2B, 2C and 2D had a length of 6.0 mm. Each of the detection vibration pieces 11A and 11B had a length of 6.0 mm. Each detecting electrode 8 had a length of 2.8 mm.

The width WD and thickness TD of each of the driving vibration pieces 2A, 2B, 2C and 2D, and the ratio (WD/TD) were changed as shown in table 1. The ratio (WT/TT) of the width WT to thickness TT of each of the detection vibration pieces 11A and 11B was adjusted at 1.9.

A supporting hole having a length of 0.75 mm and width of 0.75 mm was formed in the central part of the fixing part 4B of the vibrator. A metal pin with a diameter of 0.6 mm was inserted through the hole. The vibrator was adhered with the metal pin with a silicone resin adhesive. The thus obtained vibratory gyroscope was subjected to measurement of the zero point signal of the detection signal within a temperature range of minus 40° C. to plus 80° C.

10 vibrators were produced as described above and subjected to the above measurement. A difference of the maximum and minimum values of the zero point signal between minus 40° C. and plus 85° C. was calculated to obtain a zero point temperature drift. The average of the values of the drift (n=10) was calculated and shown in table 1. The standard deviation of the drift for 10 vibrators was also shown in table 1.

TABLE 1

| Width of Driving Vibration Piece WD ($\mu$m) | Thickness of Driving Vibration Piece TD ($\mu$m) | WD/TD | Average of Temperature Drift (%) n = 10 | Standard Deviation of Temperature Drift (%) n = 10 |
| --- | --- | --- | --- | --- |
| 300 | 50  | 6.0 | 11.2 | 1.4 |
| 300 | 100 | 3.0 | 8.6  | 0.5 |
| 300 | 150 | 2.0 | 2.3  | 0.4 |
| 240 | 100 | 2.4 | 1.9  | 0.3 |
| 200 | 100 | 2.0 | 2.6  | 0.3 |
| 200 | 130 | 1.5 | 5.3  | 0.6 |
| 200 | 150 | 1.3 | 21.3 | 4.8 |

As can be seen from table 1, it is possible to reduce the average value and deviation of the drift by adjusting the ratio (WD/TD) at a value between 1.5 and 2.4.

(Experiment 2)

Vibratory gyroscopes were produced according to the same process as the experiment 1 and subjected to measurement of the zero point temperature drift. Different from the experiment 1, the ratio (WD/TD) of the width WD to thickness TD of each of the driving vibration pieces 2A, 2B, 2C and 2D was adjusted at 2.0. The width WT, thickness TT and ratio (WT/TT) of each of the detection vibration pieces 11A and 11B were changed as shown in table 2.

TABLE 2

| Width of Detection Vibration Piece WT ($\mu$m) | Thickness of Detection Vibration Piece TT ($\mu$m) | WT/TT | Average of Temperature Drift (%) n = 10 | Standard Deviation of Temperature Drift (%) n = 10 |
| --- | --- | --- | --- | --- |
| 300 | 50  | 6.0 | 8.3  | 2.1 |
| 450 | 150 | 3.0 | 3.2  | 0.7 |
| 300 | 150 | 2.0 | 2.6  | 0.6 |
| 290 | 150 | 1.9 | 2.2  | 0.5 |
| 270 | 150 | 1.8 | 1.7  | 0.3 |
| 190 | 100 | 1.9 | 2.4  | 0.3 |
| 200 | 130 | 1.5 | 4.7  | 0.6 |
| 200 | 150 | 1.3 | 20.2 | 4.2 |

As can be seen from table 2, it is possible to further reduce the average value and deviation of the drift by adjusting the ratio (WT/TT) at a value between 1.5 and 3.0.

(Experiment 3)

The vibrator and vibratory gyroscope shown in FIGS. 8 and 9 were produced specifically, chromium films of 200 angstroms in thickness and gold films of 1000 angstroms in thickness were formed in turns on a wafer made of a Z-plate of quartz with a predetermined thickness. Both main faces of the wafer were coated with resist films, respectively, and photo masks were mounted for exposing light.

The wafer was then immersed in aqueous solution of iodine and potassium iodide to remove excessive gold in the gold film by etching, and was further immersed in aqueous solution of cerium-ammonium nitrate and perchloric acid to remove excessive chromium in the chromium film by etching. The wafer was etched by immersing the wafer in ammonium bifluoride at a temperature of 80° C. for 20 hours to form the external shape of the vibrator 5A. Resists on both faces of the wafer were removed and the wafer was then immersed in ammonium bifluoride at a temperature of 80° C. for 30 minutes to half etch the wafer. The grooves 20 and 21 were thus formed in the vibrator 5A.

Chromium films of 200 angstroms in thickness and gold films of 1000 angstroms in thickness were formed in turns on the wafer by means of vapor deposition. Both main faces of the wafer were coated with resist films, respectively, and photo masks were mounted for exposing light. The wafer was then immersed in aqueous solution of iodine and potassium iodide to remove excessive gold in the gold film by etching, and was further immersed in aqueous solution of cerium-ammonium nitrate and perchloric acid to remove excessive chromium in the chromium film by etching. The electrode films 7 and 8 were thus formed.

The thus obtained vibrator 5A had a fixing part 4B with a length of 0.4 mm and a width of 0.4 mm. Each of the driving vibration pieces 2A, 2B, 2C and 2D had a length of 1.0 mm. Each of the detection vibration pieces 11A and 11B had a length of 0.8 mm. Each detecting electrode 8 had a length of 0.5 mm.

The width WD and thickness TD of each of the driving vibration pieces 2A, 2B, 2C and 2D, and the ratio (WD/TD) were changed as shown in table 3. The ratio (WT/TT) of the width WT to thickness TT of each of the detection vibration pieces 11A and 11B was adjusted at 0.5.

Figure 10:
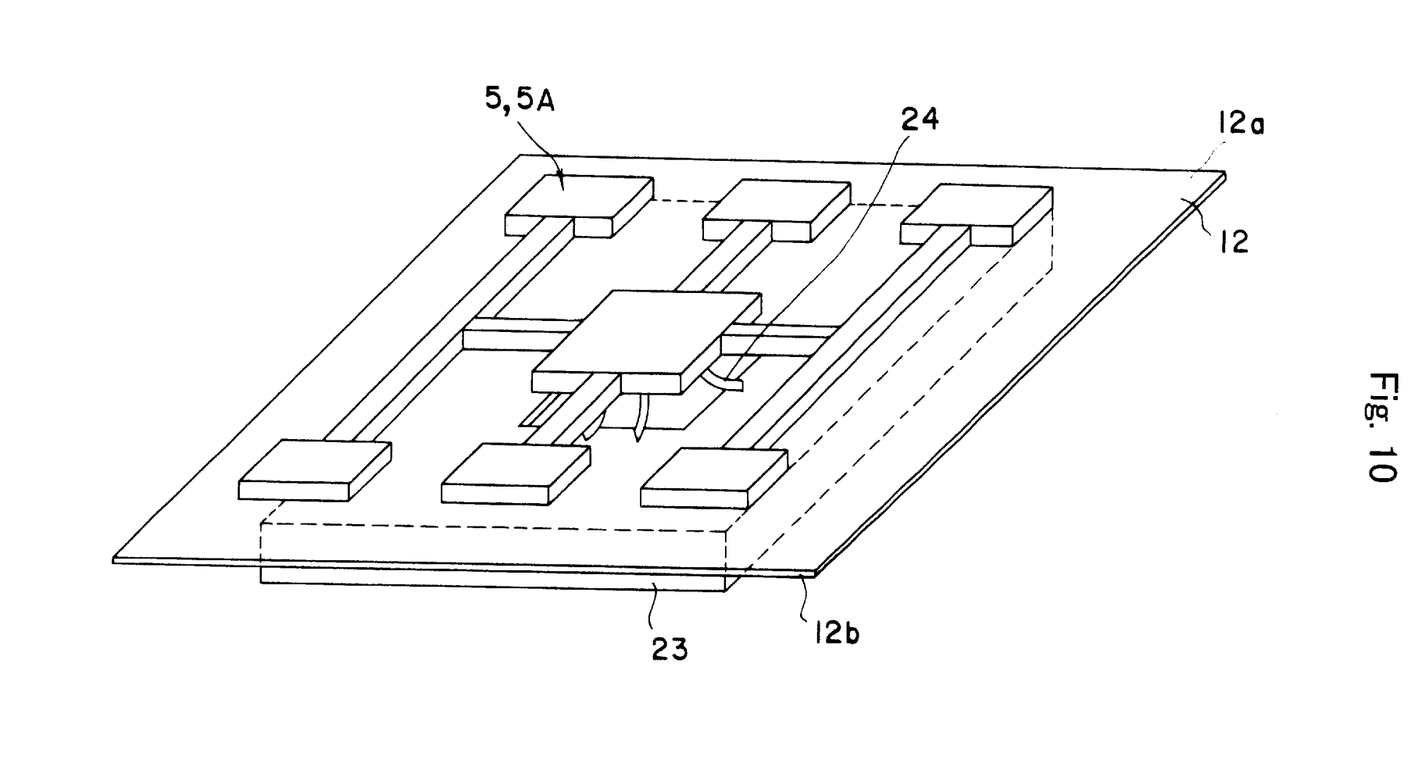
FIG. 10 is a perspective view showing a vibrator and a substrate mounting a chip 23.
Figure 11:
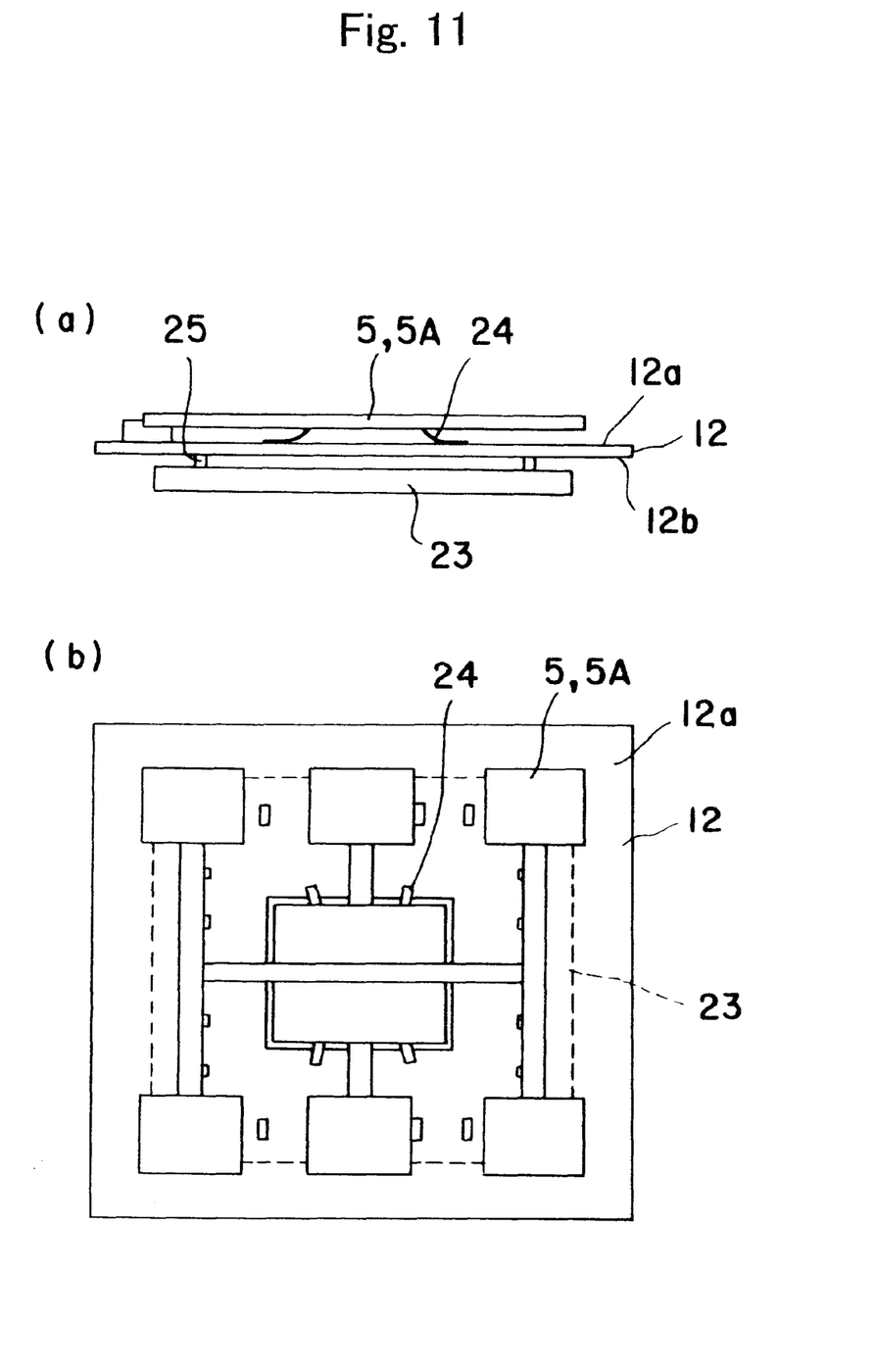

The vibrator 5 is fixed as shown in FIGS. 10 and 11. That is, the substrate 22 has a shape of a flat plate having one and the other opposing faces 12a and 12b. The vibrator 5 or 5A is supported at its lower face with bonding wires 24 over the one face 12a. The bonding wire 24 is electrically connected with electrodes (not shown) on the vibrator 5 or 5A. A semiconductor integrated circuit chip 23 is supported on the other face 12b with bonding wires 25. The electrode terminals on the vibrator 5 or 5A and the terminals of the chip 23 are connected with the electrodes on the substrate 12 by means of bonding wires, respectively. In the present example, the vibrator 5 or 5A and chip 23 are provided at positions overlapping with each other viewed in the direction of thickness of the substrate 12. The substrate 12 of the present example is a so-called flexible substrate.

The thus obtained vibratory gyroscope was subjected to measurement of the zero point signal of the detection signal within a temperature range of minus 40° C. to +80° C. 10 vibrators were produced as described above and subjected to the above measurement. A difference of the maximum and minimum values of the zero point signal between minus 40° C. and plus 85° C. was calculated to obtain a zero point temperature drift. The average of the values of the drift (n=10) was calculated and shown in table 3. The standard deviation of the drift for 10 vibrators was also shown in table 3.

TABLE 3

| Width of Driving Vibration Piece WD ($\mu$m) | Thickness of Driving Vibration Piece TD ($\mu$m) | WD/TD | Average of Temperature Drift (%) n = 10 | Standard Deviation of Temperature Drift (%) n = 10 |
| --- | --- | --- | --- | --- |
| 190 | 200 | 0.95 | 21.3 | 4.3 |
| 160 | 200 | 0.80 | 5.3 | 0.6 |
| 150 | 200 | 0.75 | 2.6 | 0.3 |
| 100 | 200 | 0.50 | 1.9 | 0.3 |
| 80 | 200 | 0.40 | 2.3 | 0.4 |
| 60 | 200 | 0.30 | 5.6 | 0.5 |
| 50 | 200 | 0.25 | 11.2 | 1.4 |

As can be seen from table 3, it is possible to reduce the average value and deviation of the drift by adjusting the ratio (WD/TD) at a value between 0.3 to 0.8.

(Experiment 4)

Vibratory gyroscopes were produced according to the same process as the experiment 3 and subjected to measurement of the zero point temperature drift. Different from the experiment 3, the ratio (WD/TD) of the width WD to thickness TD of each of the driving vibration pieces 2A, 2B, 2C and 2D at 0.5. The width WT, thickness TT and ratio (WT/TT) of each of the detection vibration pieces 11A and 11B were changed as shown in table 4.

TABLE 4

| Width of Detection Vibration Piece WT ($\mu$m) | Thickness of Detection Vibration Piece TT ($\mu$m) | WT/TT | Average of Temperature Drift (%) n = 10 | Standard Deviation of Temperature Drift (%) n = 10 |
| --- | --- | --- | --- | --- |
| 190 | 200 | 0.95 | 17.0 | 4.3 |
| 160 | 200 | 0.80 | 5.9 | 1.7 |
| 150 | 200 | 0.75 | 2.1 | 0.5 |
| 100 | 200 | 0.50 | 1.5 | 0.3 |
| 80 | 200 | 0.40 | 1.8 | 0.3 |
| 60 | 200 | 0.30 | 5.7 | 0.5 |

TABLE 4-continued

| Width of Detection Vibration Piece WT ($\mu$m) | Thickness of Detection Vibration Piece TT ($\mu$m) | WT/TT | Average of Temperature Drift (%) n = 10 | Standard Deviation of Temperature Drift (%) n = 10 |
| --- | --- | --- | --- | --- |
| 50 | 200 | 0.25 | 9.0 | 1.5 |

As can be seen from table 4, it is possible to further reduce the average value and deviation of the drift by adjusting the ratio (WT/TT) at a value between 0.3 and 0.8.

(Experiment 5)

Figure 12:
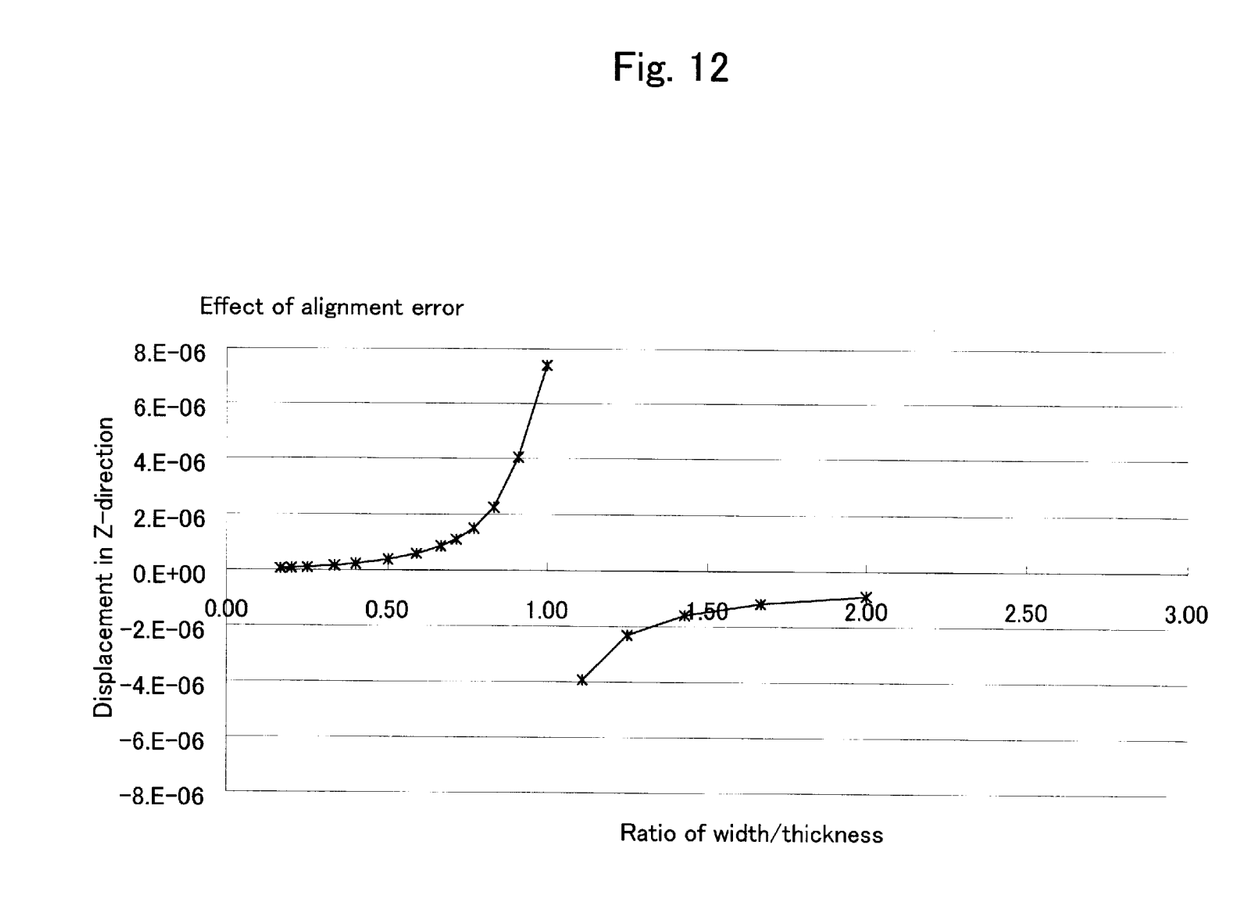
FIG. 12 is a graph showing relationship between a displacement in the direction of Z-axis (unnecessary displacement) of a bending vibration piece and a ratio of the thickness and width.

The vibrator of the experiment 1 was prepared except that the ratio of width to thickness of each driving vibration piece is variously changed. The displacement on z-axis was simulated and the results were shown in FIG. 12. The vertical axis shows the displacement on the z-axis (unnecessary displacement) and the horizontal axis shows the ratio of width/thickness of the driving vibration piece. The driving frequency of the driving vibration was set at 45 Hz and applied voltage was set at 1 volt. It was thus proved that the displacement on the z-axis may be considerably reduced within the range of the present invention. It is considered that the reduction of displacement may contribute to the reduction of the zero point temperature drift.

As described above, the zero point temperature drift of a vibrator and the deviation or change of the drift among vibrators fabricated may be reduced according to the present invention.

The present invention has been explained referring to the preferred embodiments, however, the present invention is not limited to the illustrated embodiments which are given by way of examples only, and may be carried out in various modes without departing from the scope of the invention.

What is claimed is:

1. A vibrator comprising a driving vibration piece, a detection vibration piece and a base portion connecting said driving vibration piece and detection vibration piece,
   wherein said driving vibration piece is composed of a bending vibration piece comprising a pair of surfaces parallel with each other and a pair of side faces, and said driving vibration piece has a ratio (WD/TD) of a width WD to a thickness TD of not smaller than 1.5 and not larger than 2.4.

2. The vibrator of claim 1, wherein said driving vibration piece and said detection vibration piece vibrate in bending vibration mode along a specified plane, respectively.

3. The vibrator of claim 2, wherein said specified plane is substantially parallel with said surface.

4. The vibrator of claim 1, further comprising a supporting part protruding from said base portion, wherein said driving vibration piece is supported with said supporting part.

5. The vibrator of claim 1, wherein a detecting means is not provided on said driving vibration piece.

6. The vibrator of claim 1, wherein said detection vibration piece is a bending vibration piece comprising a pair of surfaces substantially parallel with each other and a pair of side faces and has a ratio (WT/TT) of a width WT to a thickness TT of not smaller than 1.5 and not larger than 3.0.

7. The vibrator of claim 1, wherein said detection vibration piece is a bending vibration piece comprising a pair of surfaces substantially parallel with each other and a pair of side faces and has a ratio (WT/TT) of a width WT to a thickness TT of not smaller than 0.3 and not larger than 0.8.

8. The vibrator of claim 1 composed of a piezoelectric single crystal.

9. The vibrator of claim 8, wherein said piezoelectric single crystal is quartz.

10. The vibrator of claim 1 formed by etching.

11. The vibrator of claim 1, wherein one of said side faces is [2$\bar{1}\bar{1}$0] face and the other of said side faces is [$\bar{2}$110] face.

12. A vibratory gyroscope comprising the vibrator of claim 1.

13. The gyroscope of claim 12 for detecting a turning angular rate around an axis perpendicular to said surface.

14. A vibrator comprising a driving vibration piece, a detection vibration piece and a base portion connecting said driving vibration piece and detection vibration piece, wherein said driving vibration piece is composed of a bending vibration piece comprising a pair of surfaces substantially parallel with each other and a pair of side faces, and said driving vibration piece has a ratio (WD/TD) of a width WD to a thickness TD of not smaller than 0.3 and not larger than 0.8.

15. The vibrator of claim 14, wherein said driving vibration piece and said detection vibration piece vibrate in bending vibration mode along a specified plane, respectively.

16. The vibrator of claim 15, wherein said specified plane is substantially parallel with said surface.

17. The vibrator of claim 14, further comprising a supporting part protruding from said base portion, wherein said driving vibration piece is supported with said supporting part.

18. The vibrator of claim 14, wherein a detecting means is not provided on said driving vibration piece.

19. The vibrator of claim 14, wherein said detection vibration piece is a bending vibration piece comprising a pair of surfaces substantially parallel with each other and a pair of side faces and has a ratio (WT/TT) of a width WT to a thickness TT of not smaller than 1.5 and not larger than 3.0.

20. The vibrator of claim 14, wherein said detection vibration piece is a bending vibration piece comprising a pair of surfaces substantially parallel with each other and a pair of side faces and has a ratio (WT/TT) of a width WT to a thickness TT of not smaller than 0.3 and not larger than 0.8.

21. The vibrator of claim 14 composed of a piezoelectric single crystal.

22. The vibrator of claim 21, wherein said piezoelectric single crystal is quartz.

23. The vibrator of claim 14 formed by etching.

24. The vibrator of claim 14, wherein one of said side faces is [2$\bar{1}\bar{1}$0] face and the other of said side faces is [$\bar{2}$110] face.

25. A vibratory gyroscope comprising the vibrator of claim 14.

26. The gyroscope of claim 25 for detecting a turning angular rate around an axis perpendicular to said surface.

* * * * *